March 11, 1947.  C. F. KETTERING  2,417,112
ELECTRICAL CONTROL SYSTEM
Filed July 3, 1943
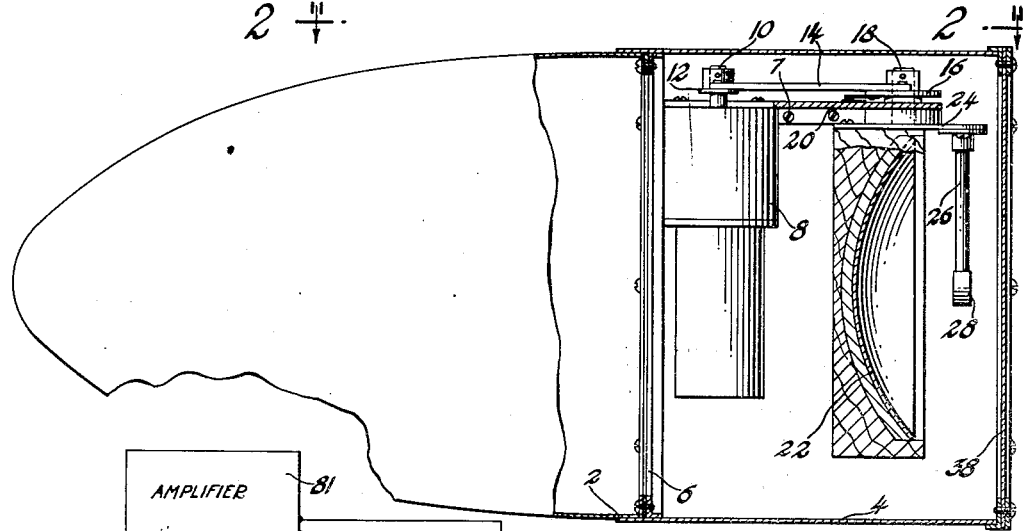
Fig. 1
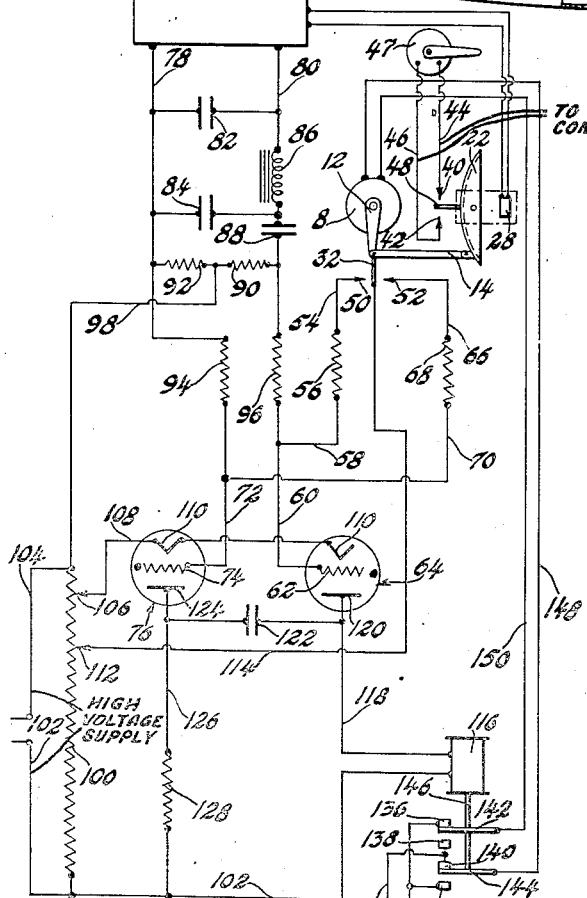
Fig. 2
Fig. 3
Inventor
Charles F. Kettering
By Blackmor, Spencer & Hurt
Attorneys Patented Mar. 11, 1947

2,417,112

UNITED STATES PATENT OFFICE 2,417,112

ELECTRICAL CONTROL SYSTEM

Charles F. Kettering, Detroit, Mich., assignor to General Motors Corporation, Detroit, Mich., a corporation of Delaware Application July 3, 1943, Serial No. 493,339

11 Claims. (Cl. 250—2)

This invention relates to a control system and more particularly to a control system for automatically maintaining a given course or route for steering a mobile craft.

There are many instances in which it is desirable or necessary to set a predetermined course and then have some mechanism or system maintain the mobile craft on said course, particularly in aircraft and marine fields. Automatic control or steering means are, in general, not new, but previously they have been adjusted or set by an operator to follow a given direction and have been actuated by direction sensitive means, such as compasses or gyroscopes. These controls, therefore, once they have been adjusted or set, follow a given direction. However, it is desirable in such cases as aerial bombs, to cause said mobile body to go to some object which may itself be moving, such as another ship. If, therefore, some characteristic force or phenomenon emanating from the remote body can be detected and through a proper control system used to control the steering means of a mobile explosive member, such as a bomb or torpedo, then the latter will seek out the remote body and remain pointed toward the same to eventually reach it regardless of movements of the remote body.

It is an object of my invention to provide automatic control means that will maintain a course toward a remote object which may be moving.

It is a further object of my invention to provide automatic steering means for a mobile body controlled by radiant heat rays.

It is a still further object of my invention to provide a control and amplifying system to operate motive means for steering apparatus.

It is a still further object of my invention to provide an electronic control system actuated by means sensitive to heat rays for controlling a steering motor.

With these and other objects in view which will become apparent as the specification proceeds, the embodiments of my invention will be best understood by reference to the following specification and claims and the illustrations in the accompanying drawing, in which:

Figure 1 is a longitudinal side view of apparatus embodying my invention, parts being broken away and shown in section;

Figure 2 is a sectional view taken on line 2—2 of Figure 1; and

Figure 3 is a circuit diagram of the electrical connections involved in my system.

Referring now more particularly to Figure 1, there is shown therein an elongated casing 2 of substantially cylindrical cross section and tapering to the rear. This casing has secured to its forward edge a cylindrical extension 4 within which is mounted the pick-up device of my invention. A vertical supporting wall 6 is supplied substantially at the junction of these two sections of the casing. Mounted on this wall 6 is a small control motor 8 whose operating shaft 10 has a lever 12 secured thereto. Pivotally connected to the outer end of the lever 12 is a transfer link 14 which in turn is pivotally connected to a second lever 16 rigidly connected to the upper end of a stub shaft 18. A horizontal supporting plate 20 carried by the upper surface of the housing for the motor 8 pivotally carries a focusing reflector 22 which is rigidly secured to the stub shaft 18 projecting through a bearing opening in the supporting plate 20. Thus as the stub shaft 18 is rotated, the focusing reflector will pivot around the shaft axis to be directed in different directions.

Secured to the upper surface of the reflector 22 is a supporting arm 24 which extends out in front of the reflector and carries a vertical supporting arm 26 upon the lower end of which is carried a heat sensitive pick-up device 28 substantially at the focus of the reflector. This heat pick-up device per se forms no part of the present invention except to state that it may be formed, for example, of a plurality of thermocouples which are spatially displaced to make the group horizontally discriminating; that is, as the balance of incoming heat rays moves horizontally the potentials of the thermocouples will differ to cause varying voltages on the connecting lines. This is completely described in my U. S. Patent 2,399,640 entitled "Temperature sensitive means" which issued May 7, 1946. Thus as the reflector is turned about its vertical axis, the heat sensitive pick-up means will remain at the focus thereof.

Also mounted on the supporting plate 20 in juxtaposition to the stub shaft 18 is a small toggle switch 30 having a movable operating member 32 which projects toward the end of the lever 16 mounted on shaft 18. This lever 16 has two upstanding flanges 34 and 36 supported on the upper face of the lever 16 and adapted to contact the switch operating member 32 as the lever and shaft rotate. Thus as the lever rotates in one direction for a certain distance, the switch will be closed on one side, which, as will be described, causes a motor reversal, and the motor will then drive the lever 16 in the other direction until the opposite member engages the switch operating means to again reverse the motor connections. Thus the motor will at all times be hunting within certain predetermined limits, if no controlling rays are picked up by the pick-up means. A protective window 38 is supported across the front of the housing, said member permitting ready passage of rays in the infrared portion of the spectrum and protecting the apparatus from weather, dirt, etc.

Referring now more particularly to Figure 3, there is shown therein the pick-up means 28 in front of the adjustable parabolic focusing reflector 22 and a switch arm 48, diagrammatically shown on the rear of the reflector, which cooperates with switch points 40 and 42 of the control circuit. The lines 44 and 46 connected to the switch points 40 and 42 go to a reversible rudder control motor 47 for maintaining the mobile craft on a predetermined course. The mechanical link coupling 14 is shown between the reflector 22 and the scanning motor 8. The lever 12 mounted on the shaft of the motor 8 also operates the switch arm 32 which oscillates between two contacts 50 and 52 through the action of the members 34 and 36 as previously described. Contact 50 is connected by line 54 with resistor 56 and through lines 58 and 60 to control grid 62 of electron discharge tube 64. Contact 52 is connected through line 66 to a resistor 68 and thence through lines 70 and 72 to control grid 74 of electron discharge tube 76. Both of these electron discharge tubes are preferably of the Thyratron type as is indicated in Fig. 3.

Lines 78 and 80 shown in the upper portion of Figure 3 are connected to the output of a D. C. amplifier 81 which is in turn connected to the pick-up 28. A filter system composed of capacitors 82 and 84 connected in parallel with these two lines and a choke coil 86 and further condenser 88 connected in series, filter the current coming into the system through these lines. A voltage divider comprising two resistors 90 and 92 is also connected across the inner end of this filter system. Two resistors 94 and 96 are connected in these lines which are then directly connected to lines 72 and 60 connected to the grids as formerly described.

A center tap from the mid-portion of the resistors 90 and 92 is connected through line 98 to one end of a voltage divider 100 across which a supply voltage of approximately 250 volts is impressed through lines 102 and 104. Various voltages may then be taken off at tapped points. One tapped position 106 is connected through line 108 with the filaments 110 of the two tubes which are in series. A second tapped point 112 is connected through line 114 to the oscillating switch member 32 controlled by the motor 8. The lower portion of the voltage divider 100 is connected through line 102 to an operating relay 116, the opposite side of which is connected through line 118 to plate 120 of tube 64 and through a coupling condenser 122 to plate 124 of tube 76. Line 126 connects the plate 124 with a resistor 128, the opposite side of which is directly connected to line 102. A separate voltage supply of, in this instance, approximately 6 volts is connected across lines 130 and 132 which cooperate with a reversing switch comprising stationary contacts 134 and 136 connected to line 132 and stationary contacts 138 and 140 connected to line 130. Movable contacts 142 and 144 carried by the armature 146 of the relay 116 oscillate between these two sets of stationary contacts to reverse the polarity on the lines 148 and 150 connected to the movable contacts 144 and 142 respectively. The lines 148 and 150 are connected directly to the scanning motor 8, the polarity determining the direction of rotation of the same.

It will be seen from the above description that there is provided a scanning motor 8 which keeps the reflector turning over a small arc continuously through the contact between switch arm 32 and the associated contacts 50 and 52 on each side thereof, even though no signal may be picked up by the infrared rays sensitive means 28. This of course also keeps the scanning means hunting in an arc ahead of the mobile body on a definite course. The tube 64 when passing current allows the relay to pull the spring or gravity biased armature to one extremity of travel and thus causes rotation of the motor in one direction. The second tube 76 is utilized to release or unfire the first tube when it passes current or has a proper potential applied to its grid. Therefore the action can be described briefly as saying that when the grid potential of tube 64 is such as to allow the tube to pass current, the motor 8 runs in one direction, and when it is non-conductive, or when tube 76 is conductive to unfire the same, the relay falls, changing the contacts and causing motor 8 to rotate in the opposite direction.

This change of grid voltage on either or both tubes can be accomplished by either closing of the mechanical switching means 32, 50 and 52 or by a change in potential on the two grids 62 and 74 through the output of the pick-up means through lines 78 and 80. Thus if potential is generated in the pick-up unit 28 through incoming radiant rays, this potential may be applied to lines 78 and 80 and cause control grids 74 or 62 to permit tube conduction, depending on the polarity which in turn is dependent on the direction of incidence of the ray upon the pick-up unit as described in the above identified patent. Thus if line 80 becomes positive, it may cause the tube 64 to cease conducting before the mechanical limit switch 32 closes its contact, which deenergizes relay 116 causing a reversal of the scanning motor contacts and that will tend to rotate in the opposite direction. If, of course, the other incoming line 78 were to be positive, then tube 76 would become deenergized and the motor contacts would be switched in the opposite direction. Thus once the detector 28 picks up the incoming infrared ray signal to cause the energization of the amplifier and the tubes 64 and 76 connected thereto, the reversals of the control motor will occur when the signal voltage on the thermocouples causes a reversal in lines 72 and 60 and the scanning member will move over a much smaller arc and tend to maintain the reflector focused on the source and since the position of the rudder is controlled by switch 40, 42, 48 the body will remain substantially directed toward said source.

I claim:

1. In automatic steering means, a pivotally mounted scanning means, means for driving said scanning means in either direction about its pivot, reversing switching means connected to the driving means, electronic means to control the switch means, additional switching means connected to and operated by the scanning means at predetermined portions of its movement to actuate the electronic means, and sensitive pick-up means carried by the scanning means connected to supply additional control voltage to the electronic means.

2. In automatic steering means, switching means for said steering means, a pivotally mounted focusing scanning means actuating said switching means by its movement, means to drive the scanning means in either direction, reversing switching means connected to the driving means, grid controlled electronic control means for the reversing switching means and additional switching means actuated by the movement of the scanning means to control grid potential and the conductive periods of the electronic means.

3. In automatic steering means, switching means for said steering means, a pivotally mounted focusing scanning means actuating said switching means by its movement, means to drive the scanning means in either direction, reversing switching means connected to the driving means, grid controlled electronic control means for the reversing switching means, additional switching means actuated by the movement of the scanning means to control grid potential and the conductive periods of the electronic means, and means supplying additional control voltage to the electronic means to superimpose its control on that of the additional switching means.

4. In automatic steering means, switching means for said steering means, a pivotally mounted focusing scanning means actuating said switching means by its movement, means to drive the scanning means in either direction, reversing switching means connected to the driving means, grid controlled electronic control means for the reversing switching means and additional switching means actuated by the movement of the scanning means to control grid potential and the conductive periods of the electronic means, and sensitive pick-up means carried at the focus of the scanning means connected to the electronic means to further control the conductive periods.

5. In automatic steering means, switching means for said steering means, a pivotally mounted focusing scanning means connected to and actuating said switching means by its movement, means to drive the scanning means in either direction, reversing switching means connected to the driving means, a pair of electronic grid controlled tubes connected to the reversing switching means, a pair of input lines to the grids, a sensitive pick-up means mounted at the focus of the scanning means, and means connecting the pick-up means to the input lines to the grids to control tube operation.

6. In automatic steering means, switching means for said steering means, a pivotally mounted focusing scanning means connected to and actuating said switching means by its movement, means to drive the scanning means in either direction, reversing switching means connected to the driving means, a pair of electronic grid controlled tubes connected to the reversing switching means, a pair of input lines to the grids, a sensitive pick-up means mounted at the focus of the scanning means, means connecting the pick-up means to the input lines to the grids, and additional switching means operated by the movement of the scanning means connected to the grid input lines to further control tube operation.

7. An electrical control system for an electric motor operatively connected to an oscillating mechanism, a pivotally mounted focusing reflector, a sensitive pick-up unit positioned substantially at the focus of the reflector and adapted to be activated by radiant energy projected by said reflector, means mounting said unit on said reflector for movement therewith whereby to scan an area having a source of signal control energy, means connecting said oscillating mechanism to said reflector and unit, a source of unidirectional current, reversing switch means, limit switch means having an operative connection to said reflector and movable to circuit closing position at the limiting position of said reflector, circuit connections operatively coupling the electric motor to said source of unidirectional current and said reversing switch means, and a controlling circuit operatively coupling said pick-up unit and said limit switch means to said reversing switch means in such manner as to vary the rate of reversal of said last-named means upon energization of said pick-up unit by signal control energy projected thereon by said reflector.

8. In a control system for an electric motor, movably mounted scanning means for focusing radiant energy, means for driving the scanning means, a direction sensitive pick-up responsive to radiant energy and positioned at the focal point of the scanning means to receive concentrated radiant energy signals, a switch actuated at a definite limit position of the scanning means, and control means to reverse the driving means and thus the direction of movement of the scanning means, said control means being actuable either by said pick-up or by said switch.

9. In a control system for an electric motor, a pivotally mounted scanning means, a reversible rotary motor for driving the scanning means, switching means for controlling the direction of rotation of said motor, electronic means controlling said switching means, limit switching means actuated by the position of the scanning means over a predetermined large angle, a pick-up mounted upon the scanning means to receive incoming focused radiant energy from said scanning means, and means controlled by the reception of energy by said pick-up to limit the sweep of said scanning means to a small angle within said predetermined large angle.

10. In a control system for an electric motor, a pivotally mounted focusing scanning means, a pick-up sensitive to radiant energy and positioned at the focal point of the scanning means, means for driving said scanning means in either direction about its pivot, reversing switching means controlling the direction of movement of said scanning means, electronic means controlling the operation of said reversing switching means by said pick-up when above a minimum quantity of energy is being received by said pick-up, and limit switching means operated by the scanning means to energize said electronic means to control said reversing switching means when below a minimum quantity of energy is received by said pick-up.

11. In an automatic control system for an electric motor, a pair of grid controlled tubes, switching means for controlling the grid potential on said tubes, a pivotally mounted focusing scanning means for actuating said switching means at predetermined limits of its movement, means actuated by said motor to oscillate the scanning means in alternate directions, electrically operated reversing switching means controlling the direction of oscillation of the scanning means, circuit means controlled by said pair of tubes and controlling the energization of the electrically operated switching means, and means including a radiant energy pick-up at the focal point of said scanning means dominating the first mentioned switching means when a radiant energy signal is received by said pick-up.

CHARLES F. KETTERING.

REFERENCES CITED

The following references are of record in the file of this patent:

UNITED STATES PATENTS

| Number | Name | Date |
| --- | --- | --- |
| 1,387,850 | Hammond | Aug. 16, 1921 |
| 2,158,584 | Koster | May 16, 1939 |
| 2,176,469 | Moueix | Oct. 17, 1939 |